April 26, 1966 R. V. MATHISON 3,247,559
FASTENERS WITH INVERTIBLE BASES
Filed Jan. 8, 1965
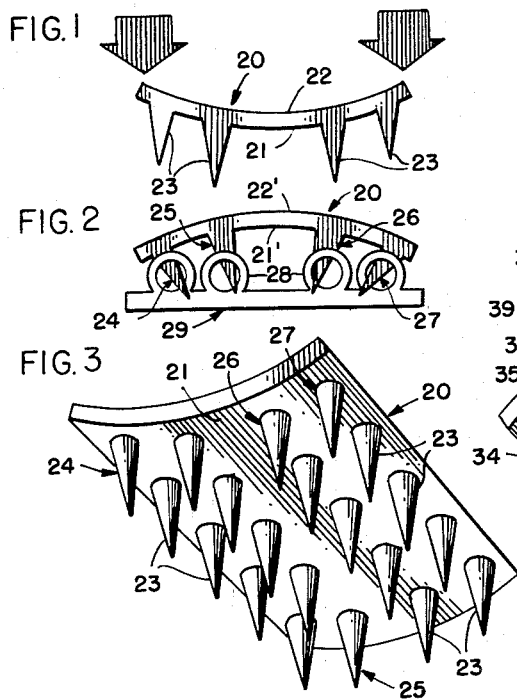
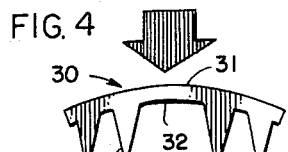
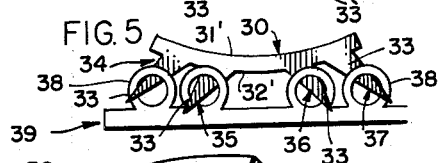
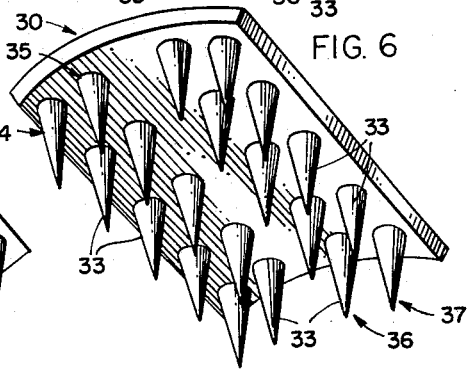
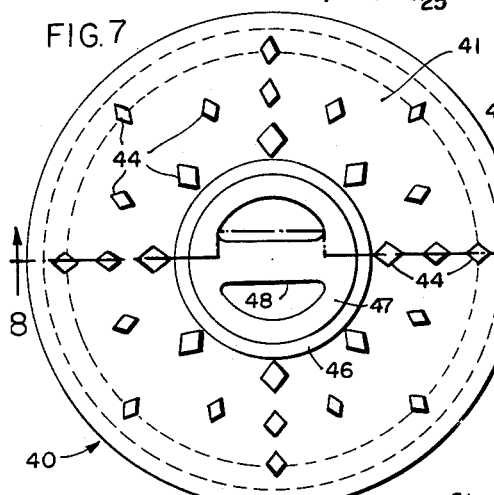
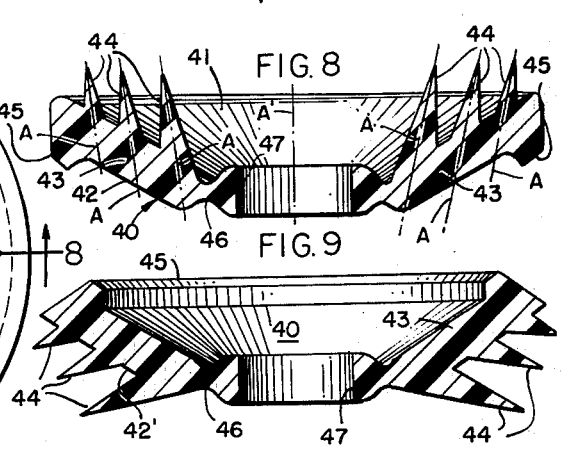
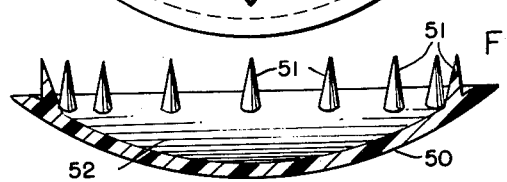
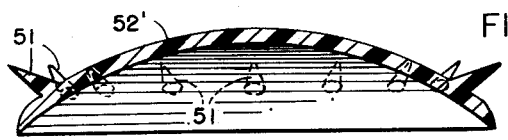
INVENTOR:
ROBERT V. MATHISON
BY
Marzall, Johnston, Cook & Root
ATT'YS

United States Patent Office 3,247,559
Patented Apr. 26, 1966

3,247,559
FASTENERS WITH INVERTIBLE BASES
Robert V. Mathison, 5 Woodcrest Road, Asheville, N.C.
Filed Jan. 8, 1965, Ser. No. 424,274
12 Claims. (Cl. 24—87)

This application is a continuation-in-part of my copending application Serial No. 285,261, filed June 4, 1963.

This invention, in general, pertains to fasteners comprising a curved wall base in which the curved wall is invertible and a plurality of small, tapered projections emanating from a curved face of said base. Before inversion, the longitudinal axes of the projections are oriented so that the projections may be pushed easily into interstices or pores of a surface-porous member, e.g., a fabric. After inversion with the projections embedded in the interstices or pores, the projections assume positions wherein the longitudinal axes of respective projections extend in at least two diverse directions. In the latter positions, the projections grip the porous member, e.g., fabric, to hold the fastener on the porous member. When the base is re-inverted to a position in which the projections assume their initial position, the fastener and the porous member are separated easily.

The fasteners of this invention constitute new innovations in fastener structures and in techniques of securing a fastener to a porous, projection-penetrable member, such as a fabric with projection-penetrable interstices. The invention, the underlying principles thereof and the advantages of the fasteners of the invention will be appreciated further from the following description of some preferred, illustrated embodiments.

In the drawings:

FIG. 1 is an end elevation of a fastener with an invertible, transversely-curved, projection-carrying strip as the base thereof in positions ready for insertion of the projections into a porous member;

FIG. 2 is a schematic, end elevation of the fastener of FIG. 1 in inverted form with the projections embedded in interstices of a loop fabric to grip the fabric on the fastener;

FIG. 3 is a perspective view of the embodiment of FIG. 1;

FIG. 4 is an end elevation of another embodiment of an invertable, transversely-curved, projection-carrying strip as the base thereof in position ready for insertion of the projections into a porous member;

FIG. 5 is a schematic, end elevation of thhe fastener of FIG. 4 in inverted form with the projections embedded in interstices of a loop fabric to grip the fabric on the fastener;

FIG. 6 is a perspective view of the embodiment of FIG. 4;

FIG. 7 is a top plan view of another embodiment of the invention, in which embodiment the invertible, transversely-curved base is disc-shaped;

FIGS. 8 and 9 are sections taken on section plane 8—8 of FIG. 7 with the curved base in normal and inverted positions, respectively, in which figures projections other than those cut by the section plane are omitted; and FIGS. 10 and 11 are diametric sections of still another embodiment of the invention wherein the invertible, transversely-curved base is disc-shaped and the base is in normal and inverted positions, respectively.

Referring to the drawings, the fastener embodiments have the following common features. When the fasteners are in normal position (ready for insertion of the projections into a porous member, e.g., a fabric), the bases are curved transversely in at least one direction. The number of directions of transverse curvatures is infinite in the case of embodiments like those of FIGS. 7–11. The projections, in this position, are oriented so that their longitudinal axes are essentially parallel. The degree of parallelism required depends primarily on the sizes of the pores or interstices of the porous member in which the projections are to be seated and also on the penetrability thereof. As a general rule of thumb, the small, tight interstices or pores such as small, tight interstices of tightly woven or tightly knotted fabrics require a greater degree of parallelism of the projections in order to provide adequate and easy penetration of the projections into the interstices than is the case with porous members having large or open interstices or pores such as the open or loose interstices of a loosely woven, knotted or loop pile fabric. For purposes of this invention, "essentially parallel" or "substantially parallel" in reference to the orientation of the axes of the projections encompasses a range from absolute parallel axes to axes which diverge or converge as much as about 45°. In the case of relatively large angles of divergence or convergence, it is sometimes necessary or expedient to work the projections into the pores or interstices by pressure manipulation or the like before inverting the base to cause the projections to become firmly gripped in the porous member.

Another common characteristic of the illustrated embodiments is that, upon inversion of the transversely curved bases, the axes of the projections assume a different, relative, angular relationship, i.e., a degree of convergence or divergence whereby the sides of the projections press against the sides of the projection-penetrated pores or interstices to provide a relatively firm grip between the porous member and the fastener.

Still another common feature is that the fasteners preferably are made entirely of a thermoplastic or thermosetting synthetic polymer, such as a polyformaldehyde polymer, a polyolefin polymer such as polyethylene or polypropylene, a polyamide such as nylon 6 or nylon 66, polytetrafluoroethylene, polyvinylchloride, homopolymers and copolymers, polystyrene, etc. The preferred method of manufacture comprises molding the fastener articles from the polymer in the form of a polymer base and polymer projections formed integrally on the respective bases.

Still another common feature pertains to the inversion properties of the bases. The transverse curvatures of the bases can be inverted from the aforesaid normal curvature to the inverse curvature, and vice versa, and the base will have sufficient rigidity in either transversely curved position to remain therein, i.e., it will not spring back of its own accord once it is inverted. This property can be provided by the use of polymers wihch inherently have the property when molded in the prescribed shape and/or structural design of the bases. In general, the polymers employed have some flexibility in bending but are relatively non-elastic at least to the extent that the aforesaid spring back is avoided. As a general rule, the bases snap when inverted from one transverse curvature to the other.

A further common feature of the embodiments is that the projections taper from their respective bases to relatively sharp tips. The projections may have pointed tips, tips with a relatively sharp, narrow edge or slightly blunted tips. Suitable shapes for the projections include regular or oblique cones or frusto-cones, regular or oblique pyramids or frusto-pyramids, regular or oblique triangular prisms or slightly blunted forms thereof and the like.

The embodiment of FIGS. 1–3 has as its invertible base a strip 20 having a transverse curvature providing a transversely convex face 21 and a transversely concave face 22 when the base strip is in its initial or projection-insertion position. The convex face 21 has thereon a plurality of conical projections 23, the longitudinal axes of which are essentially parallel in the projection-insertion position. The projections 23 are arranged in longitudinal, parallel rows, two of which, i.e., rows 24 and 25, are on one side of the longitudinal axis of strip 20 and the other two of which, i.e., rows 26 and 27, are on the other side of said axis.

When strip 20 is inverted transversely to the position shown in FIG. 2 by pressure exerted along the longitudinal edges as shown by the arrows (FIG. 1), transversely concave face 22 becomes a transversely convex face 22', and transversely convex face 21 becomes a transversely concave face 21'. The projections 23, if embedded in the pores or interstices of a porous member, e.g., the loops 28 of loop pile fabric 29, during the transverse inversion, grip the porous member by assuming a new orientation wherein the axes of the projections in rows 24 and 25 on the one hand and axes of the projections in rows 26 and 27 on the other hand converge. The sides of the projections closest to the longitudinal axis of the strip bear against the sides of the interstices, e.g., the loops to resist pull-apart separation of the fastener and the porous member. In the case of FIGS. 1-3, the porous member should be one having a relatively stiff base or be mounted in an environment stiffening the base of the porous member so that it does not flex easily and thereby lose its grip with the fastener.

The embodiment of FIGS. 4-6 comprises an invertible base strip 30 having a transverse curvature providing a transversely convex face 31 and a transversely concave face 32 when the base strip is in the initial or projection-insertion position. The concave face 32 has thereon a plurality of conical projections 33, the longitudinal axes of which are essentially parallel in the projection-insertion position. The projections 33 are arranged in essentially parallel longitudinal rows. Rows 34 and 35, on the one hand, and rows 3 and 37, on the other hand, are on opposite sides of the longitudinal axis of the strip.

When strip 30 is inverted transversely to the position shown in FIG. 5 by pressure exerted along the longitudinal axis as shown by the arrow in FIG. 4, the transversely convex face 31 becomes a transversely concave face 31', and transversely concave face 32 becomes a transversely convex face 32'. When projections 33 are embedded in a porous member, e.g., the loops 38 of loop pile fabric 39, during the transverse inversion, the projections grip the porous member by assuming a new orientation wherein the axes of the projections in rows 34 and 35 on the one hand and the projections in rows 36 and 37 on the other hand, diverge. The sides of the projections farthest from the longitudinal axis of the strip bear against the sides of the interstices of the porous member and tend to create a tension effect in the porous member to assist the grip of the porous member on the fastener.

The embodiments of FIGS. 7-9 and FIGS. 10-11 function in a manner closely related to the embodiment of FIGS. 4-6. The base member in FIGS. 7-9 is an invertible disc 40 falling in the broad class of convexo-concave discs. Specifically, the disc 40 has a concave face 41 and a convex face 42 when the disc is in the projection-insertion position. The outer portion of the disc is a hollow, frusto-cone 43, from the concave face of which emanate oblique pyramidal projections 44. The projections lie in three concentric, circular imaginary lines. The length of the projections in respective circles decreases progressively in a direction radially outwardly whereby the tips of the projection lie essentially in a common plane. When the disc is in the projection-insertion position (FIG. 8), the axes of the projections are essentially parallel within the aforesaid definition of the latter. More precisely, in reference to the illustrated embodiment, the longitudinal axes A of the projections on one side of the disc axis A' diverge with respect to the longitudinal axes A on the diametrically opposite side.

The remaining parts of the disc 40 include an annular rib or ring enlargement strengthening the outer edge, an annular neck or "weakened zone" which flexes when the disc is inverted, and a central ring section 47 joined by annular neck to the inner edge of the hollow, frusto-cone 43.

The ring 47 has a diametric bar 48 which may be used to attach the disc-fastener 40 to another member, e.g., by looping thread, twine or the like about bar 48.

When disc 40 is placed on a fabric or other porous member with the projections facing the fabric, it is inverted by pressing on the central portion in a direction toward the fabric. When the disc inverts to the position shown in FIG. 9, the projections 44 assume a greater divergence, i.e., closer to a radial orientation. The fabric or other porous member is gripped on the projections and is held thereon by the projections diverging in many directions from the radial center of the fastener. The inversion tends to stretch the fabric over the newly-formed convex face 42' and thereby work the penetrated fabric toward the bases of the projections, thereby aiding in holding the gripped fabric on the diverging projections.

The embodiment of FIGS. 10 and 11 is a simplified form of the invertible disc-type fastener. It comprises a hollow disc of the convexo-concave class in which the convexo-concave base has a substantially uniform thickness. The projections 51 are arranged in a circle near the periphery of the disc and emanate from the concave face 52. Their longitudinal axes are essentially parallel to each other and the axis of the disc when the disc is in the projection-insertion position. Upon inversion wherein the concave face becomes convex face 52', the projections diverge relative to the axis of the disc and approach a radial divergence to grip in a manner similar to the embodiment of FIGS. 7-9.

The snap-type inversion of the bases is a preferred characteristic thereof so that the bases stay in either position of inversion. Thermoplastics of various types give this function, and are the preferred materials. The invention, in its broadest aspects, however, contemplates the use of other materials such as sheet metal with bases shaped as aforedescribed and wherein the projections are formed by stamping the projections out of the sheet in the orientations aforedescribed.

The fasteners may be used in a manner whereby the fastener itself serves the desired purpose, e.g., as a removable decorative member attached to a fabric; an advertising button, political campaign button, or like button to be removably attached to clothing, etc. On the other hand, the fasteners may be used to removably attach diverse types of articles, which are attached to the fastener by any suitable means, to porous members such as woven fabrics, knotted fabrics, loop pile fabrics, etc.

The projections may be of the same or different lengths, as desired. When arranged in a plurality of straight or curved rows, they may be such that the projections of respective rows are the same length, with length variations of projections from row to row. For example, the respective groups of longitudinal rows on opposite sides of the longitudinal center portion of the strips of FIGS. 1-6 have the projections of respective rows arranged wherein the projection lengths become progressively longer in a direction away from the respective, longitudinal edge of the strip toward the center portion (FIGS. 1-3) or become progressively longer in a direction toward the respective, longitudinal edges from the center portion (FIGS. 4-6). Similarly, the projections in respective, concentric rows in FIGS. 7-9 become progressively shorter in the radially outward direction.

The projections may be small-dimensioned, if desired, e.g., lengths in the order of 0.03 to 0.15 inch. The bases of the projections preferably have at least a 0.03 inch dimension. When arranged in a plurality of rows, the tips of the projections of one row may overlie the next adjacent row of projections when the fastener is in the inverted, gripping position (FIGS. 2, 5, and 9). In the cases of FIGS. 1-6, the projections preferably are spaced in the respective, longitudinal rows at spacings at their bases of 0.03 to 0.10 inch. The projections preferably are arranged closely enough to occur at a frequency equivalent to about 200-500 projections per square inch of the outline of the area of the face embracing the projections.

It will be recognized that the invention herein described may take many forms, and modifications other than the specific embodiments herein described can be made within the spirit and scope of the generic invention.

The invention is hereby claimed as follows:

1. A fastener article comprising a base having at least one transverse, invertible curvature providing a convex face and a concave face, a plurality of projections emanating from one of said faces with the longitudinal axes thereof being essentially parallel, and said projections, upon inversion of said base and the respective faces thereof, assuming orientations wherein the longitudinal axes of projections toward one end of the respective, transverse curvatures change orientations relative to the longitudinal axes of other projections toward the opposite ends of said respective, transverse curvatures, said base having flexibility to snap into said invertible curvature upon application of pressure to cause inversion of said base and having sufficient rigidity in either transversely curved position to remain therein.

2. A fastener article comprising a base with at least one transverse, invertible curvature providing a convex face and an opposite, concave face, a plurality of projections emanating from said opposite, concave face and extending outwardly therefrom, and the longitudinal axes of said projections, upon inversion of said base and consequent inversion of said concave face, assuming orientations wherein the longitudinal axes of projections on opposite ends of said transverse curvature diverge at substantial angles of divergence in a direction away from said opposite face when so inverted.

3. A fastener article comprising a disc-shaped member wherein the opposite faces respectively are convex and concave, a plurality of tapered projections extending outwardly from said concave face, said projections being disposed on said concave face in at least one annular row, and the longitudinal axes of said projections, upon inversion of said base and consequent inversion of said concave face, assuming orientations wherein the longitudinal axes of projections on diametric opposite sides diverge at substantial angles of divergence in a direction away from said inverted, now convex face, said base having sufficient flexibility to be inverted and having sufficient rigidity to remain in said inverted position when so inverted.

4. A fastener article as claimed in claim 3 wherein said projections are arranged in a plurality of concentric, annular rows.

5. A fastener article as claimed in claim 4 wherein the lengths of the longitudinal axes of said projections become progressively shorter in respective annular rows in a direction outwardly from the radial center of said disc-shaped member.

6. A fastener article as claimed in claim 3, and means on the radial central portion of said disc for attaching another article to said fastener article.

7. A fastener as claimed in claim 3 wherein said concave and convex faces are defined by an annular, hollow frusto-cone portion of said base surrounding the central portion thereof, and an annular neck less flexibly rigid than said frusto-cone portion and connecting the radially inner edge of the latter with the radially outer edge of said central portion.

8. A fastener comprising a transversely arched, elongated strip of a synthetic polymer having oppositely disposed, concave and convex faces, and a plurality of closely spaced, substantially rigid, tapered projections of said synthetic polymer extending outwardly from one of said faces, said projections all being substantially parallel to each other, said strip having sufficient flexibility to snap into oppositely, transversely arched, inverted shape upon application of pressure to cause inversion of said base and having sufficient rigidity to remain in inverted position, once so inverted.

9. A fastener as claimed in claim 8 wherein projections extend outwardly from the concave face, and said transverse arch is invertible to change said concave face to a convex face and said convex face to a concave face and simultaneously to cause said projections to change a first group of projections adjacent one longitudinal edge of said strip into projections sloping away from the longitudinal center portion of said strip and to change a second group of said projections adjacent the opposite longitudinal edge of said strip into projections sloping away from the longitudinal center portion of said strip.

10. A fastener as claimed in claim 8 wherein projections extend outwardly from the convex face, and said transverse arch is invertible to change said concave face to a convex face and said convex face to a concave face and simultaneously to cause said projections to change to a first group of projections adjacent one longitudinal edge of said strip into projections sloping toward the longitudinal center portion of said strip and to change a second group of said projections adjacent the opposite longitudinal edge of said strip into projections sloping toward the longitudinal center portion of said strip.

11. A fastener as claimed in claim 8 wherein said projections in each of said groups are in longitudinal rows with the projections of the respective rows being progressively longer in a direction toward the respectively longitudinal edge of said strip from said center portion.

12. A fastener as claimed in claim 10 wherein said projections in each of said groups are in longitudinal rows with the projections of the respective rows being progressively longer in a direction away from the respectively longitudinal edge of said strip from said center portion.

References Cited by the Examiner

UNITED STATES PATENTS

| 1,465,717 | 8/1923 | Mercer | 24—87 |
| 1,921,999 | 8/1933 | Dickinson | 24—87 |
| 2,587,292 | 2/1952 | De Voe | 24—87 X |
| 3,031,730 | 5/1962 | Morin. | |
| 3,134,152 | 5/1964 | Pei | 24—203 X |

FOREIGN PATENTS 957,110  2/1950  France.

WILLIAM FELDMAN, *Primary Examiner.*

BERNARD A. GELAK, *Assistant Examiner.*